(No Model.)  3 Sheets—Sheet 2.
A. CHRISTIN.
SLEEPING CAR.
No. 324,815. Patented Aug. 25, 1885.
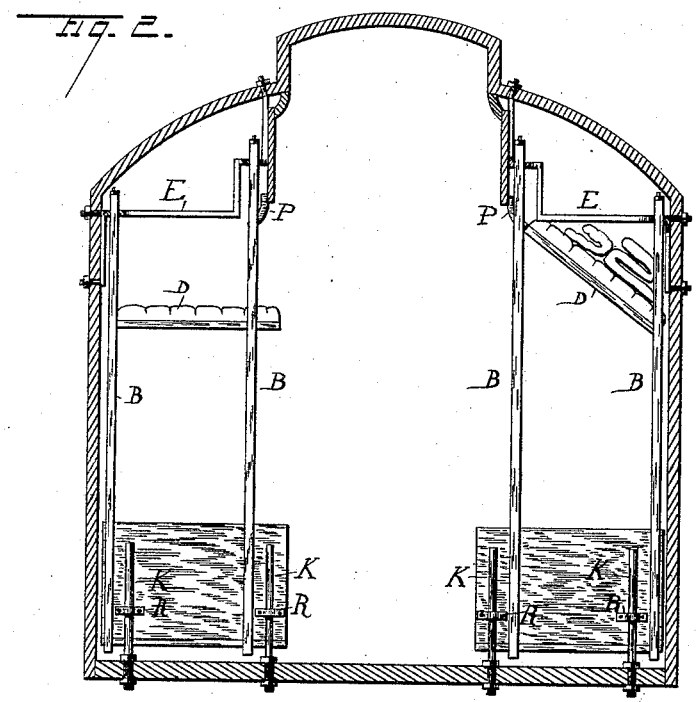
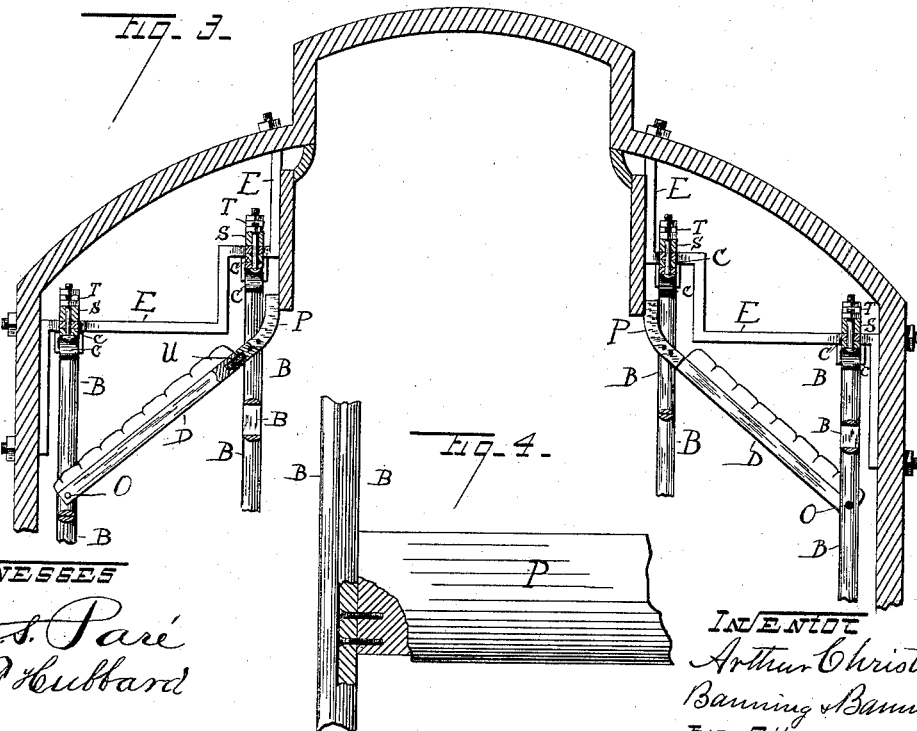

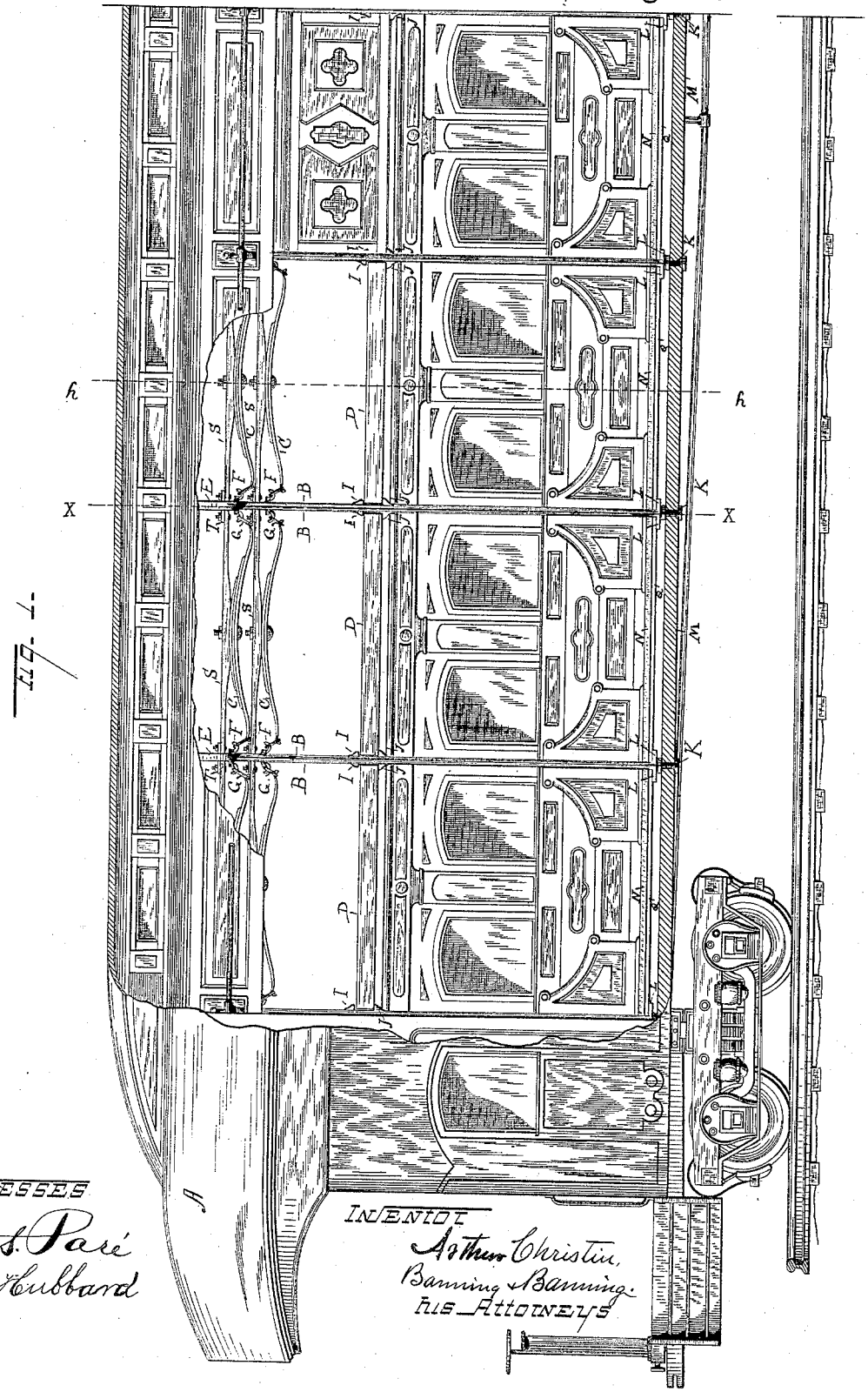

(No Model.) 3 Sheets—Sheet 3.
A. CHRISTIN.
SLEEPING CAR.
No. 324,815. Patented Aug. 25, 1885.
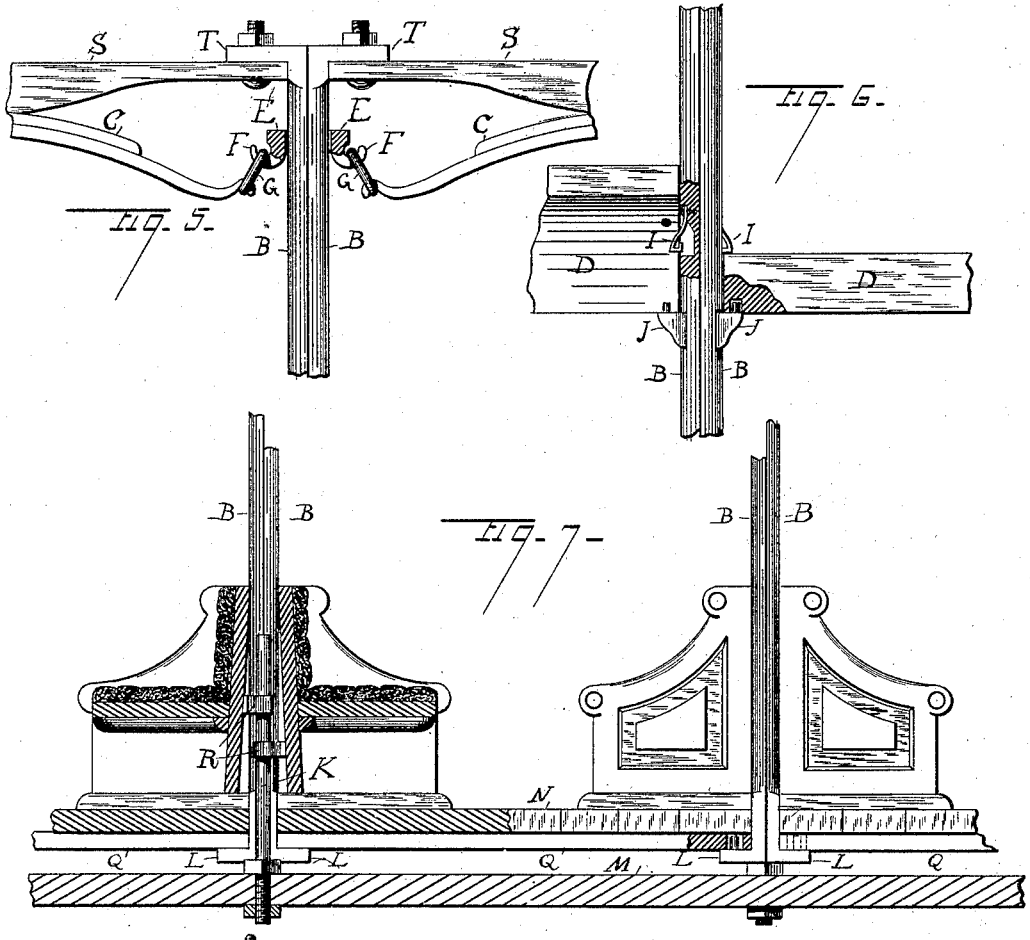
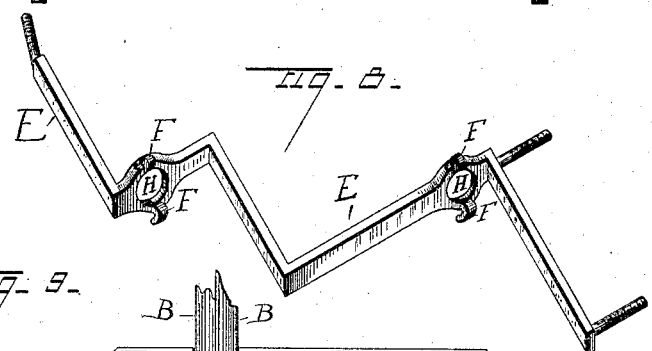
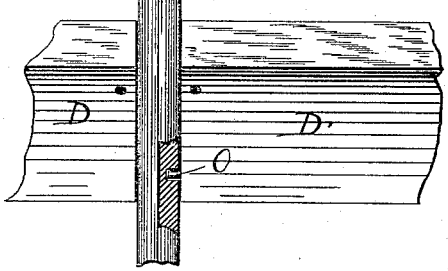
WITNESSES
A. S. Paré
E. P. Hubbard.
INVENTOR
Arthur Christin
Banning & Banning.
His Attorneys

UNITED STATES PATENT OFFICE.

ARTHUR CHRISTIN, OF CHICAGO, ILLINOIS.

SLEEPING-CAR.

SPECIFICATION forming part of Letters Patent No. 324,815, dated August 25, 1885.

Application filed May 7, 1885. (No model.)

*To all whom it may concern:*

Be it known that I, ARTHUR CHRISTIN, a citizen of the United States, residing at Chicago, Illinois, have invented certain new and useful Improvements in Passenger and Sleeping Cars, of which the following is a specification.

The object of my invention, stated in general terms, is to construct a passenger and sleeping car that will be to a great extent free from the present jarring and jolting caused by the resting or placing of the seats on the floor; and my invention consists in the features and arrangements of construction hereinafter described.

In the drawings, Figure 1 is a side elevation of a car containing my improvements, with a portion of the side broken away to exhibit the same. Fig. 2 is a transverse sectional view of the same, taken in line *x x* of Fig. 1. Fig. 3 is a transverse sectional view of the same, taken in line *y y* of Fig. 1. Fig. 4 is a detail view of the piece or section into which the berth when it is closed is locked or catched. Fig. 5 is a detail view of the suspending-rods and springs. Fig. 6 is a detail view showing a section of said suspending-rods and the berths, one open and the other closed. Fig. 7 is a detail view of the suspending-rods and the seats, showing the means of supporting the seats. Fig. 8 is a detail view of the brackets by which the suspending-rods, with their berths and seats, are supported; and Fig. 9 is a detail view showing a portion of the suspending-rods and the pivot on which the back sides of the berths turn in opening or closing.

In the drawings, A represents a passenger and sleeping car; B, the rods for sustaining the weight of the berths and seats; C, the springs to which the suspending-rods are attached, and by which they are relieved from the jarring and jolting of the car; D, the berths of the cars; E, the brackets to which the springs are attached and by which the weights of the suspending-rods, berths, and seats are received; F, hooks on such brackets to which the springs may be attached; G, links for attaching the springs to such hooks; H, holes in the brackets through which the suspending-rods are loosely passed; I, springs on the suspending-rods next to the aisle, for locking the berths in place when open; J, projections or supports on such suspending-rods to receive the weight of the berth when open; K, guiding-rods to guide the seats as they vibrate up and down with the suspending-rods; L, flanges at the bottom or lower end of the suspending-rod to receive the weight of the seat; M, the permanent floor of the car; N, the seat-floor; O, the pivot for attaching the back edge of the berths to the suspending-rods, on which they turn; P, the piece into which the front edge of the berth is catched or locked when closed; Q, a bar which rests on the flanges at the lower end of the suspending-rods, on which the seat-floor is placed; R, the eyes or brackets through which the guiding-rods are passed in guiding the seat. S are the bars connecting the tops of the suspending-rods to each other, and to the middle of which the springs C are attached. T are flanges on the tops of the suspending-rods for attaching them to these connecting-bars, and U is a bolt or catch for locking the berth to the piece P when closed.

In making a passenger and sleeping car containing my improvement I take the frame of an ordinary passenger and sleeping car with the seats and berths removed and place in its upper part brackets on each side to impart strength and means for attaching and suspending the various parts hereinafter described. One of these brackets is shown in Fig. 8 of the drawings. The form of this bracket as shown in that figure has been adopted because of its convenience, and not because no other form could be used for the bracket. Its object being simply to form a means at each side of the car for suspending and sustaining the weight of the various features hereinafter described, its form may be varied at pleasure. I attach this bracket firmly and securely to the respective sides of the car by passing two of its members out through the sides of the car and the other through the top of the car and securing them in place by nuts, as plainly shown in Figs. 2 and 3, or by other convenient means. I have provided in each of these brackets two holes, H, for the suspending-rods hereinafter described, one of which is close to the wall of the car and the other of which is close to the aisle, forming two rows the length of the car, but leaving in each case sufficient distance to arrange the parts as hereinafter described and have an aisle of proper width.

Around these holes for the suspending-rods, or at each side of them rather, toward the longitudinal axis of the car, I have cast or provided hooks F for the attachment of the springs. The brackets are placed at proper intervals apart through the length of the car for the seats to be placed between them. The seats face each other as in ordinary sleeping-cars. I then make sets of springs to be attached to these various hooks F on the brackets E. One set of springs is placed in each interval between the brackets. I have shown these springs as the ordinary leaf-springs are made, though it is unimportant as to their exact construction. As their object is to receive the weight of the suspending-rods, berths, and seats hereinafter described, to permit them to vibrate up and down, much latitude is permissible in their form and arrangement, so long as they perform the office for which I have designed them. These sets of springs are connected to the hooks F by means of links G particularly shown in Figs. 1 and 5, and are attached to the connecting-bars S, at their middles, by bolts, nuts, or other convenient means. With these brackets and springs in place as above described, I next put in the suspending-rods on which the weight of the seats and berths is to be supported. These suspending-rods are passed up loosely through the holes H in the brackets, and are provided at their upper and lower ends with flanges L and T. The upper flanges rest upon the ends of the connecting-bars S, and serve to suspend them therefrom. These connecting-bars S are made strong and able to sustain the heavy weight to which they are intended to be subjected. As they rest on the springs, they of course vibrate up and down with them, and impart the same yielding or vibratory motion to the rods, seats, and berths suspended on them. If desired, these flanges may be securely fastened to the ends of the connecting-bars S by means of bolts and nuts, though they may be attached in any other convenient manner or permitted to rest simply upon them. The bottom flanges, L, are intended to receive and sustain the seats. When the sustaining-rods are all in place, they form two rows or series along the length of the car, one row being placed near the walls of the car and the other near the edge of the center aisle. In this respect they correspond to the sets of holes provided in the series of brackets above described. I prefer to place these suspending-rods in pairs, as shown in various figures, and particularly in Figs. 5, 6, and 7. Each pair of suspending-rods is preferably made flat at one side and rounding as to the other, so that when the two are placed with their flat surfaces together they will form a round outline as to the whole. The object of thus placing them in sets, instead of making the two solid together, is to permit the seats resting on flange L of one of them to vibrate up and down independently of the seats placed on flange L of its mate, and also to permit the berths in each section to vibrate independently of those in the next immediate section. I also provide these suspending-rods, at a point a proper distance above the floor at which the bottom of the upper berth when open should rest, with projections or flanges J, and at a proper distance above these projections J, and so that they will be above the top of the berth when open and in place, and on the same suspending-rods, I provide springs I, particularly shown in detail in Fig. 6, which will be pressed in as the berth descends into place when open, and spring out above the upper edge of the berth-frame, as shown in the right-hand portion of Fig. 6, and so lock the berth open. In case of accident, the berth will thus be prevented from closing upon an occupant or of being closed involuntarily or automatically. In attaching the berths to these suspending-rods I pivot the rear edge of the berth to the rear rods, so that they may be turned up and down at pleasure. This pivoting is shown in Fig. 3 as it appears looking lengthwise of the car, and in Fig. 9 as it appears from the aisle of the car, with a portion of the rod broken away to exhibit it. The seats are attached to the lower flanges, L, of the suspending-rods, which are raised somewhat above the permanent floor of the car to permit them to vibrate up and down independently of it, by placing bars Q, extending lengthwise of the car, from the flange of one suspending-rod to the flange of the other, as shown particularly in Fig. 7, and then placing the seat-floor on these bars and extending it out from the side of the car to the edge of the center aisle. This will permit the seat-floor of each section of the car containing two facing seats to vibrate up and down on their respective suspending-rods independently of the other sections. As these seat-floors are raised somewhat above the permanent floor of the car, it would be well, to prevent inconvenient or undesirable depression along the central aisle of the car, to raise that portion of the permanent floor to a proper height to make the whole floor of the car on a uniform plane. Instead of an actual permanent floor under the seat-floor, a skeleton frame-work only may be employed. In either case the seat-floor is raised above the permanent bottom frame-work of the car, so as to vibrate freely up and down.

To guide the seats in their vibration up and down, I have also provided guide-rods K, which may be placed at the ends of the seats next to the walls, and also at the ends of the seats next to the aisles. It is immaterial whether two or more be used or not, so long as they serve the purpose for which I have intended them. The backs of the seats are attached to them by means of loosely-fitting eyes or brackets R, (shown in Figs. 2 and 7,) which will permit the seats to vibrate up and down.

To close the space inclosed by the berths when shut, and at the same time to connect the berths which, as above said, are pivoted on the suspending-rods to freely vibrate up and down with them, I provide a piece, P, (shown in Figs. 2 and 3, looking lengthwise of the car, and in Fig. 4, looking from the aisle of the car.) This piece is screwed or otherwise attached to the front suspending-rods in each section, so that it can move up and down with such rods, while its upper end fits loosely but neatly behind the vertical section of the dome of the car, as plainly shown in Fig. 3. At the lower end of this piece a hole or slot is provided, in which a bolt or catch, U, may be sprung to hold the section in place when closed, as shown in the left-hand side of Fig. 3. When the berth is open, this piece remains in place, as shown in the left-hand side of Fig. 2.

When the parts have all been arranged as above described, the berths and seats in each section will be independent of those in every other section of the car, and will be able to vibrate up and down independently of them. If a jolt should occur at one end or one side of the car, it will not be conveyed to all portions of the car, as it is when the seats rest directly upon the floor, or when all of the berths are suspended to the tops and sides of the car, or rest upon the seats without any means of breaking any jar that may be received at either end or side. With my arrangement, should one end or side of the car pass over an obstruction, it will not affect the seats or berths at another part of the car, as each section of the seats and berths would be so suspended on the rods that it could vibrate up and down independently of every other section. In this way a great improvement and advantage will be secured in dispensing with much of the jolting and jarring to which passengers are subjected when traveling in cars of the ordinary construction.

It is obvious that my improvements are equally applicable to ordinary passenger-cars, as well as to sleeping-cars, the principal changes necessary to be made being the dispensing of the berths; and it can be used to suspend the berth without the seats, and so used for sleeping purposes alone by disconnecting the seat-floor from the suspending-rods and resting the seats on the permanent frame-work of the car.

What I claim is—

1. A sleeping-car provided with seats and berths whose weight is sustained by rods or uprights suspended or hung from the upper portions of the car, and held above and free from its permanent bottom frame-work by yielding or vibratory supports, whereby such rods, seats, and berths may vibrate up and down independently of such permanent bottom frame-work, substantially as described.

2. A sleeping-car provided with seats whose weight is sustained by rods or uprights suspended or hung from the upper portions of the car, and held above and free from its permanent bottom frame-work by yielding or vibratory supports, whereby such rods and seats may vibrate up and down independently of such permanent bottom frame-work, substantially as described.

3. A sleeping-car provided with berths whose weight is sustained by rods or uprights having flanges or projections to receive and support the weight of the front edges of the berths when open, and a spring or springs to hold the berths open, such rods or uprights being suspended or hung from the upper portions of the car, and held above and free from its permanent bottom frame-work by yielding or vibratory supports, whereby such rods and berths may vibrate up and down independently of such permanent bottom frame-work, substantially as described.

4. A sleeping-car provided with seats and berths whose weight is sustained by rods or uprights suspended or hung from the upper portions of the car, and held above and free from its permanent bottom frame-work by yielding or vibratory supports arranged in separate and independent sets or sections capable of yielding or vibrating independently of other sets or sections, whereby the rods, seats, and berths in each section may vibrate up and down independently of the other rods, seats, and berths, substantially as described.

5. A sleeping-car provided with seats whose weight is sustained by rods or uprights suspended or hung from the upper portions of the car, and held above and free from its permanent bottom frame-work by yielding or vibratory supports arranged in separate and independent sets or sections capable of yielding or vibrating independently of other sets or sections, whereby the rods and seats in each section may vibrate up and down independently of such permanent bottom frame-work and independently of the other rods and seats, substantially as described.

6. A sleeping-car provided with berths whose weight is sustained by rods or uprights having flanges or projections to receive and support the weight of the front edges of the berths when open, and a spring or springs to hold the berths open, such rods or uprights being suspended or hung from the upper portions of the car, and held above and free from its permanent bottom frame-work by yielding or vibratory supports arranged in separate and independent sets or sections capable of yielding or vibrating independently of other sets or sections, whereby the rods and berths in each section may vibrate up and down independently of such permanent bottom frame-work and independently of the other rods and berths, substantially as described.

ARTHUR CHRISTIN.

Witnesses:
EPHRAIM BANNING,
E. F. HUBBARD.